(12) United States Patent
Song

(10) Patent No.: US 12,305,492 B2
(45) Date of Patent: May 20, 2025

(54) METHODS OF CHARACTERIZING A SPATIAL PROPERTY OF A PREVIOUSLY FRACTURED STAGE OF A HYDROCARBON WELL AND HYDROCARBON WELLS THAT PERFORM THE METHODS

(71) Applicant: ExxonMobil Technology and Engineering Company, Spring, TX (US)

(72) Inventor: Limin Song, West Windsor Township, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 185 days.

(21) Appl. No.: 18/158,096

(22) Filed: Jan. 23, 2023

(65) Prior Publication Data

US 2023/0250712 A1    Aug. 10, 2023

Related U.S. Application Data

(60) Provisional application No. 63/267,741, filed on Feb. 9, 2022.

(51) Int. Cl.
*E21B 43/119* (2006.01)
*E21B 43/116* (2006.01)
(Continued)

(52) U.S. Cl.
CPC ......... *E21B 43/119* (2013.01); *E21B 43/116* (2013.01); *E21B 43/26* (2013.01);
(Continued)

(58) Field of Classification Search
CPC ...... E21B 33/12; E21B 43/116; E21B 43/119; E21B 43/26; E21B 43/267; E21B 47/107;
(Continued)

(56) References Cited

U.S. PATENT DOCUMENTS

| 8,157,011 B2 * | 4/2012 | Taylor | E21B 28/00 166/250.1 |
| 11,268,914 B2 * | 3/2022 | Prasad | G01N 23/00 |

(Continued)

*Primary Examiner* — Daniel P Stephenson
(74) *Attorney, Agent, or Firm* — ExxonMobil Technology and Engineering Company—Law Department

(57) ABSTRACT

Methods of characterizing a spatial property of a previously fractured stage of a hydrocarbon well and hydrocarbon wells that perform the methods. The hydrocarbon wells include a wellbore that extends within a subsurface region. The methods include receiving a received acoustic wave. The received acoustic wave is initiated by a downhole acoustic wave source that is positioned within an uphole region of the wellbore. The uphole region of the wellbore extends within a subsequently fractured stage of the hydrocarbon well and is uphole from a downhole region of the wellbore, which extends within the previously fractured stage of the hydrocarbon well. The received acoustic wave includes a previously fractured stage characteristic acoustic component generated via propagation of the received acoustic wave within the downhole region of the wellbore. The methods also include analyzing the previously fractured stage characteristic acoustic component to characterize the spatial property of the previously fractured stage.

20 Claims, 6 Drawing Sheets

(51) Int. Cl.
*E21B 43/26* (2006.01)
*E21B 43/267* (2006.01)
*E21B 47/107* (2012.01)
*E21B 49/00* (2006.01)
*G01V 1/104* (2006.01)
*G01V 1/50* (2006.01)
*E21B 33/12* (2006.01)

(52) U.S. Cl.
CPC .......... *E21B 43/267* (2013.01); *E21B 47/107* (2020.05); *E21B 49/00* (2013.01); *G01V 1/104* (2013.01); *G01V 1/50* (2013.01); *E21B 33/12* (2013.01); *G01V 2210/646* (2013.01)

(58) Field of Classification Search
CPC .......... E21B 49/00; G01V 1/104; G01V 1/42; G01V 1/50; G01V 2210/1299; G01V 2210/1429; G01V 2210/646
See application file for complete search history.

(56) References Cited

U.S. PATENT DOCUMENTS

| | | | |
|---|---|---|---|
| 2012/0111560 A1* | 5/2012 | Hill .......................... | E21B 43/26 166/308.1 |
| 2013/0062057 A1* | 3/2013 | Smith, Jr. ............. | E21B 43/267 166/254.2 |
| 2019/0203574 A1* | 7/2019 | Yi ........................... | E21B 43/11 |
| 2022/0325621 A1* | 10/2022 | Moos ..................... | E21B 43/26 |
| 2022/0365239 A1* | 11/2022 | Rose ...................... | G06F 3/048 |
| 2023/0147476 A1* | 5/2023 | Wheelock ............... | E21B 47/26 367/82 |
| 2023/0250712 A1* | 8/2023 | Song ...................... | E21B 43/119 175/4.57 |
| 2023/0392482 A1* | 12/2023 | Dusterhoft ............ | E21B 47/135 |
| 2024/0153057 A1* | 5/2024 | Handa .................. | G06T 7/0004 |

* cited by examiner ated via propagation of the received acoustic wave within the downhole region of the wellbore. The methods also include analyzing the previously fractured stage characteristic acoustic component of the received acoustic wave to characterize the spatial property of the previously fractured stage.

METHODS OF CHARACTERIZING A SPATIAL PROPERTY OF A PREVIOUSLY FRACTURED STAGE OF A HYDROCARBON WELL AND HYDROCARBON WELLS THAT PERFORM THE METHODS

CROSS-REFERENCE TO RELATED APPLICATION

This application claims the benefit of U.S. Provisional Application Ser. No. 63/267,741, entitled "Methods of Characterizing a Spatial Property of a Previously Fractured Stage of a Hydrocarbon Well and Hydrocarbon Wells That Perform the Methods," filed Feb. 9, 2022, the disclosure of which is hereby incorporated by reference in its entirety.

FIELD OF THE INVENTION

The present disclosure relates generally to methods of characterizing a spatial property of a previously fractured stage of a hydrocarbon well and/or to hydrocarbon wells that perform the methods.

BACKGROUND OF THE INVENTION

Multi-stage hydraulic fracturing operations may be utilized to form a plurality of fractures, which are spaced apart along a length of a wellbore of a hydrocarbon well. Once formed, the fractures increase fluid permeability of the subsurface region and/or decrease resistance to fluid flow from a subterranean formation that extends within the subsurface region and into the wellbore, thereby increasing a production rate of the hydrocarbon well.

While hydraulic fracturing operations are well established, they often suffer from significant, or unexpected, variability. This variability may be caused by a variety of factors, including changes in the geology of the subsurface region and/or a lack of fracture uniformity along the length of the wellbore. Once fracturing operations are completed, the hydrocarbon well generally is brought up to production; and it may be difficult to predict production performance of the hydrocarbon well before it is brought up to production. In addition, it may be costly to re-fracture a hydrocarbon well that is not producing as expected.

Methodologies for characterizing fractures, during fracturing operations, have been proposed. However, these conventional methodologies generally rely upon installation of expensive downhole equipment and/or interruption of the hydraulic fracturing operations. Thus, and while these conventional methodologies may be effective in certain circumstances, they may not always be cost-effective and may cause undesirable delays. Thus, there exists a need for improved methods of characterizing a spatial property of a previously fractured stage of a hydrocarbon well and/or for improved hydrocarbon wells that perform the methods.

SUMMARY OF THE INVENTION

Methods of characterizing a spatial property of a previously fractured stage of a hydrocarbon well and hydrocarbon wells that perform the methods are disclosed herein. The hydrocarbon wells include a wellbore that extends within a subsurface region, and the previously fractured stage includes at least one previous stage fracture that extends from the wellbore. The methods include receiving, with an acoustic transducer, a received acoustic wave. The received acoustic wave is initiated by a downhole acoustic wave source that is positioned within an uphole region of the wellbore. The uphole region of the wellbore extends within a subsequently fractured stage of the hydrocarbon well and is uphole from a downhole region of the wellbore, which extends within the previously fractured stage of the hydrocarbon well. The received acoustic wave includes a previously fractured stage characteristic acoustic component generated via propagation of the received acoustic wave within the downhole region of the wellbore. The methods also include analyzing the previously fractured stage characteristic acoustic component of the received acoustic wave to characterize the spatial property of the previously fractured stage.

DETAILED DESCRIPTION OF THE INVENTION

Figure 1:
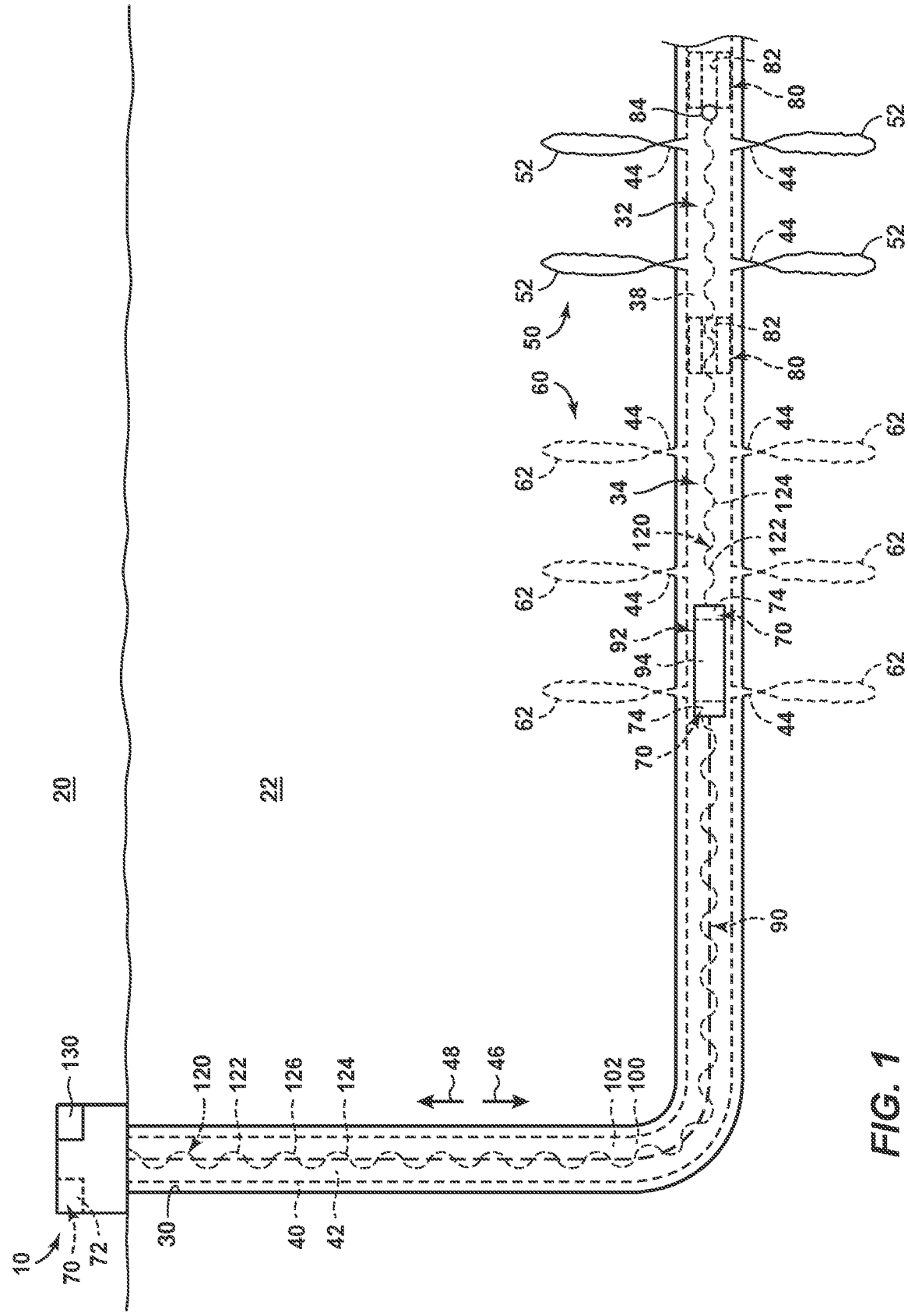
FIG. 1 is a schematic illustration of examples of a hydrocarbon well, according to the present disclosure.

FIGS. 1-6 provide examples of hydrocarbon wells 10, of methods 200, and/or of received acoustic waves 120, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure. In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

FIG. 1 is a schematic illustration of examples of a hydrocarbon well 10, according to the present disclosure. Hydrocarbon wells 10 include a wellbore 30 that extends within a subsurface region 22. Wellbore 30 additionally or alternatively may be referred to herein as extending between a surface region 20 and subsurface region 22. Hydrocarbon wells 10 also include a previously fractured stage 50. Previously fractured stage 50 includes at least one previous stage fracture 52 that extends from a downhole region 32 of wellbore 30 and/or into subsurface region 22. Downhole region 32 may be referred to herein as extending within previously fractured stage 50.

Hydrocarbon wells 10 further include a downhole acoustic wave source 92, which is positioned within an uphole region 34 of wellbore 30. Uphole region 34 extends within a subsequently fractured stage 60 of hydrocarbon well 10 and is uphole from downhole region 32.

Hydrocarbon wells 10 also include an acoustic transducer 70, which may be configured to receive a received acoustic wave 120 that may be initiated by downhole acoustic wave source 92. Hydrocarbon wells 10 further may include a plug 80. Plug 80 may be positioned within a region of wellbore 30 that is between uphole region 34 and downhole region 32 and may include an aperture 82. Aperture 82 may be configured to permit and/or facilitate fluid communication between uphole region 34 and downhole region 32.

Hydrocarbon wells 10 also include a controller 130. Controller 130 is programmed to analyze received acoustic wave 120 and/or to characterize a spatial property of previously fractured stage 50 based, at least in part, on the received acoustic wave. This may include performing any suitable step and/or steps of methods 200, which are discussed in more detail herein.

As an example, and during completion operations performed within hydrocarbon well 10, downhole acoustic wave source 92 may be utilized to produce, to generate, and/or to initiate an acoustic wave within wellbore 30. The acoustic wave may have a plurality of components, including a downhole acoustic wave 124, which initially propagates in a downhole direction 46 from downhole acoustic wave source 92 and/or along a length of wellbore 30, and an uphole acoustic wave 126, which initially propagates in an uphole direction 48 from the downhole acoustic wave source and/or along the length of the wellbore.

Uphole acoustic wave 126 may, in some examples, be received by acoustic transducer 70 and/or may define at least a corresponding portion and/or component of received acoustic wave 120. Downhole acoustic wave 124 may travel through aperture 82 and/or into downhole region 32 of wellbore 30 and may propagate within the downhole region of the wellbore. This propagation, within downhole region 32, may modify one or more properties of the downhole acoustic wave, thereby producing and/or generating a previously fractured stage characteristic acoustic component 122 therein.

In some examples, the downhole acoustic wave may resonate within the downhole region of the wellbore. In such examples, the previously fractured stage characteristic acoustic component also may be referred to herein as and/or may be a previously fractured stage resonance component. In some examples, the downhole acoustic wave may be filtered within the downhole region of the wellbore. In such examples, the previously fractured stage characteristic acoustic component also may be referred to herein as and/or may be a previously fractured stage filtered component.

At least a fraction of downhole acoustic wave 124, including at least a fraction of previously fractured stage characteristic acoustic component 122, may propagate to acoustic transducer 70 and define at least a portion and/or component of received acoustic wave 120. Controller 130 may receive information regarding received acoustic wave 120 from acoustic transducer 70 and may characterize the spatial property of the previously fractured stage of the hydrocarbon well based, at least in part, on the received acoustic wave and/or on the previously fractured stage characteristic acoustic component of the received acoustic wave.

Wellbore 30 may include and/or be any suitable hole and/or conduit that may be formed, defined, and/or established in and/or within subsurface region 22. Wellbores 30 generally are formed via a drilling operation and are at least partially tubular and/or at least partially cylindrical. However, this is not required. It is within the scope of the present disclosure that wellbore 30 may include and/or be a horizontal, a vertical, and/or a deviated wellbore 30. Stated differently, wellbore 30 may include one or more horizontal, vertical, and/or deviated regions.

Previously fractured stage 50 includes a portion and/or subset of subsurface region 22 that previously was fractured and/or that includes previous stage fractures 52. Stated differently, previously fractured stage 50 previously may have been completed and/or fractured, such as via performing one or more steps of methods 200, which are discussed in more detail herein. In general, previously fractured stage 50 includes at least one previous stage fracture 52 and, in some examples, may include a plurality of previous stage fractures. As discussed in more detail herein, methods 200 may be utilized to quantify and/or to characterize a uniformity of previous stage fractures 52 and/or a fluid permeability of previous stage fractures 52. As also discussed in more detail herein, previously fractured stage 50 also may be referred to herein as, may be modelled as, and/or may be a liquid-filled volume 38.

As illustrated in dashed lines in FIG. 1, and as discussed in more detail herein with reference to methods 200, subsequently fractured stage 60 also may be fractured. Stated differently, subsequently fractured stage 60 may be completed and/or include and/or have defined therein at least one subsequent stage fracture 62. In such examples, and as also discussed in more detail herein, methods 200 may be utilized to quantify and/or to characterize a uniformity of subsequent stage fractures 62 and/or a fluid permeability of subsequent stage fractures 62. Additionally or alternatively, methods 200 may be utilized to compare uniformity and/or fluid permeability between two or more fractured stages, such as between previously fractured stage 50 and subsequently fractured stage 60.

Plug 80 may include any suitable structure that may be configured to be at least temporarily positioned and/or affixed within wellbore 30 and/or that may define aperture 82. Examples of plug 80 include an expanding plug and/or a bridge plug. In some examples, and as illustrated in FIG. 1 in connection with plug 80 that defines a downhole end of previously fractured stage 50, plugs 80 may be configured to receive a sealing device 84, such as a ball sealer. Such a configuration may permit and/or facilitate selective occlusion of a corresponding aperture 82, thereby permitting a region of wellbore 30 that is uphole from the plug to be pressurized, such as via a fracturing liquid 102 that may be provided to the wellbore from the surface region.

Downhole acoustic wave source 92 may include any suitable structure that may be adapted, configured, designed, and/or constructed to produce and/or to generate the acoustic wave, including downhole acoustic wave 124 and/or uphole acoustic wave 126.

Controller 130 may include any suitable structure that includes acoustic transducer 70 and/or that may be adapted, configured, designed, and/or programmed to communicate with acoustic transducer 70, to receive information regarding received acoustic wave 120 from the acoustic transducer, to analyze previously fractured stage characteristic acoustic component 122 of the received acoustic wave, to characterize the spatial property of previously fractured stage 50, and/or to perform one or more steps of methods 200. As examples, controller 130 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct controller 130 to perform any suitable portion, or subset, of methods 200. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In some examples, acoustic transducer 70 may include and/or be a surface acoustic transducer 72, which may be positioned within surface region 20. In some examples, acoustic transducer 70 may include and/or be a subsurface acoustic transducer 74, which may be positioned within wellbore 30 and/or within subsurface region 22. Subsurface acoustic transducer 74, when present, may be attached to, directly attached to, and/or operatively attached to downhole acoustic wave source 92 and/or to a tool string 90 that includes the downhole acoustic wave source. This may include being attached to and/or uphole from an uphole end of downhole acoustic wave source 92 and/or being attached to and/or downhole from a downhole end of the downhole acoustic wave source. In some examples, acoustic transducer 70 may include both surface acoustic transducer 72 and subsurface acoustic transducer 74.

As illustrated in dashed lines in FIG. 1, wellbore 30 may include and/or may be at least partially, or even completely, filled with a wellbore fluid 100, examples of which include a liquid, water, a hydrocarbon, and/or a liquid hydrocarbon. Acoustic transducer 70 may be in contact and/or in fluid communication with wellbore fluid 100, thereby permitting and/or facilitating propagation of received acoustic wave 120 into acoustic contact with the acoustic transducer.

In some examples, and as illustrated in dashed lines in FIG. 1, hydrocarbon well 10 further may include a downhole tubular 40. Downhole tubular 40, when present, may extend within wellbore 30 and/or may define a tubular conduit 42. When hydrocarbon wells 10 include downhole tubular 40, downhole acoustic wave source 92 and/or plug 80 may be positioned within tubular conduit 42. Additionally or alternatively, and when hydrocarbon wells 10 include downhole tubular 40, fractures, such as previous stage fracture 52 and/or subsequent stage fracture 62, may extend from perforations 44 that are defined within the downhole tubular.

Figure 2:
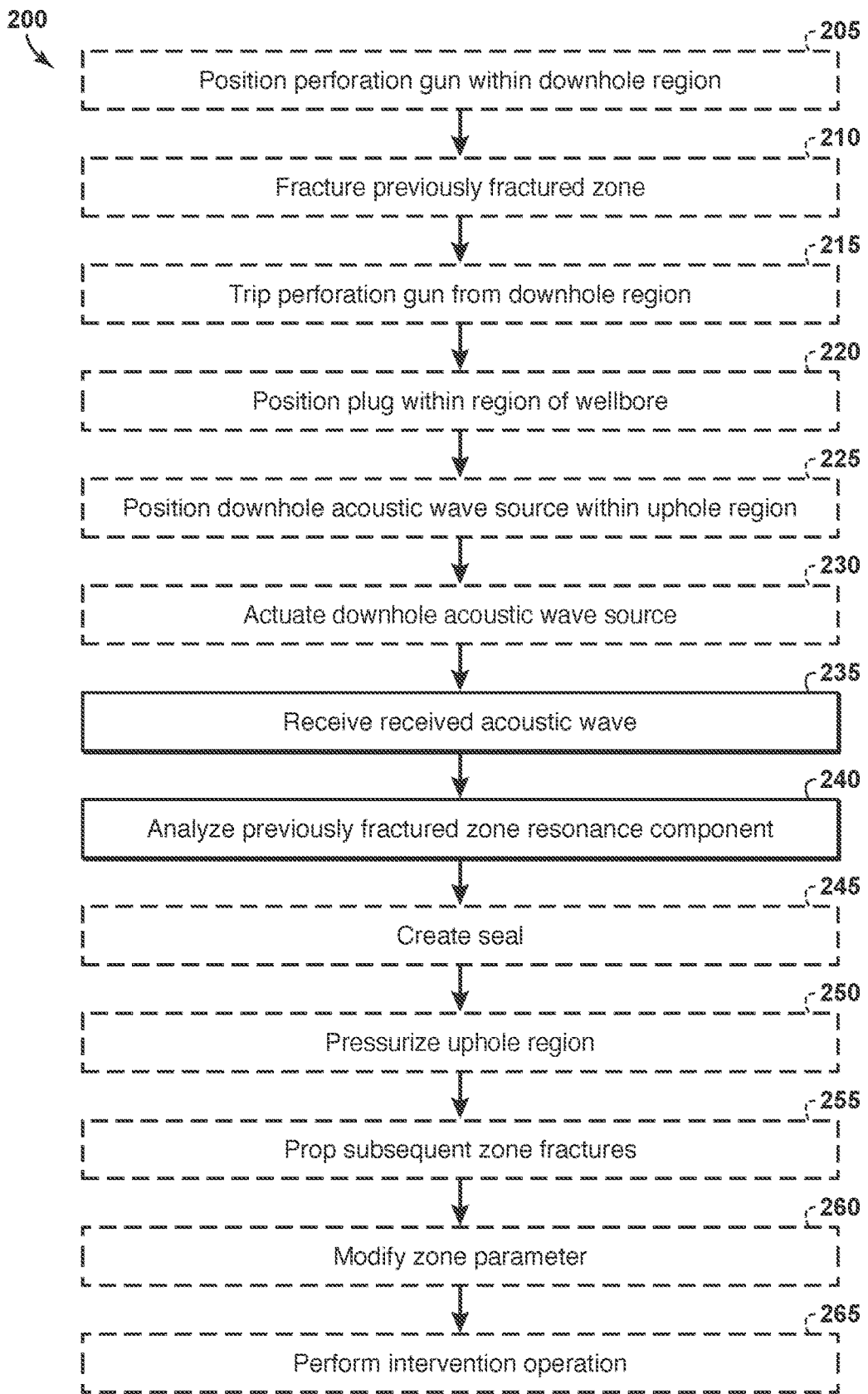
FIG. 2 is a flowchart illustrating examples of methods of characterizing a spatial property of a previously fractured stage of a hydrocarbon well, according to the present disclosure.

FIG. 2 is a flowchart illustrating examples of methods 200 of characterizing a spatial property of a previously fractured stage of a hydrocarbon well, according to the present disclosure. The hydrocarbon well includes a wellbore that extends within a subsurface region. The previously fractured stage includes at least one previous stage fracture that extends from the wellbore and/or into the subsurface region. A downhole acoustic wave source may be positioned within an uphole region of the wellbore, which extends within a subsequently fractured stage of the hydrocarbon well. The uphole region is uphole from a downhole region of the wellbore, which extends within the previously fractured stage. A plug may be positioned within a region of the wellbore that is between the uphole region of the wellbore and the downhole region of the wellbore. The plug may include an aperture that provides fluid communication between the uphole region of the wellbore and the downhole region of the wellbore.

Examples of the hydrocarbon well are disclosed herein with reference to hydrocarbon well 10. Examples of the wellbore are disclosed herein with reference to wellbore 30. Examples of the downhole region of the wellbore are disclosed herein with reference to downhole region 32. Examples of the uphole region of the wellbore are disclosed herein with reference to uphole region 34. Examples of the previously fractured stage are disclosed herein with reference to previously fractured stage 50. Examples of the subsequently fractured stage are disclosed herein with reference to subsequently fractured stage 60. Examples of the plug are disclosed herein with reference to plug 80. Examples of the downhole acoustic wave source are disclosed herein with reference to downhole acoustic wave source 92.

Methods 200 may include positioning a perforation gun at 205, fracturing a previously fractured stage at 210, tripping the perforation gun from the downhole region at 215, and/or positioning a plug within a region of a wellbore at 220. Methods 200 also may include positioning a downhole acoustic wave source at 225 and/or actuating the downhole acoustic wave source at 230. Methods 200 include receiving a received acoustic wave at 235 and analyzing a previously fractured stage characteristic acoustic component at 240. Methods 200 further may include creating a seal at 245, pressurizing the uphole region at 250, propping subsequent stage fractures at 255, modifying a stage parameter at 260, and/or performing an intervention operation at 265.

Positioning the perforation gun at 205 may include positioning the perforation gun within the downhole region of the wellbore. This may include flowing and/or otherwise translating the perforation gun in a downhole direction, from the surface region, and/or into the downhole region of the wellbore.

Figure 3A:
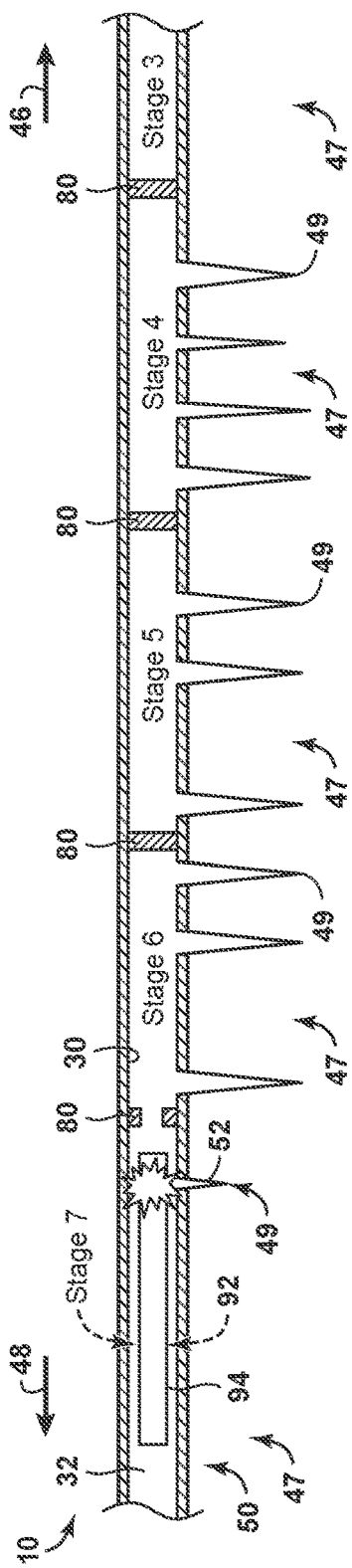
FIG. 3A and FIG. 3B are schematic illustrations of a region of a hydrocarbon well during methods, according to the present disclosure.
Figure 3B:
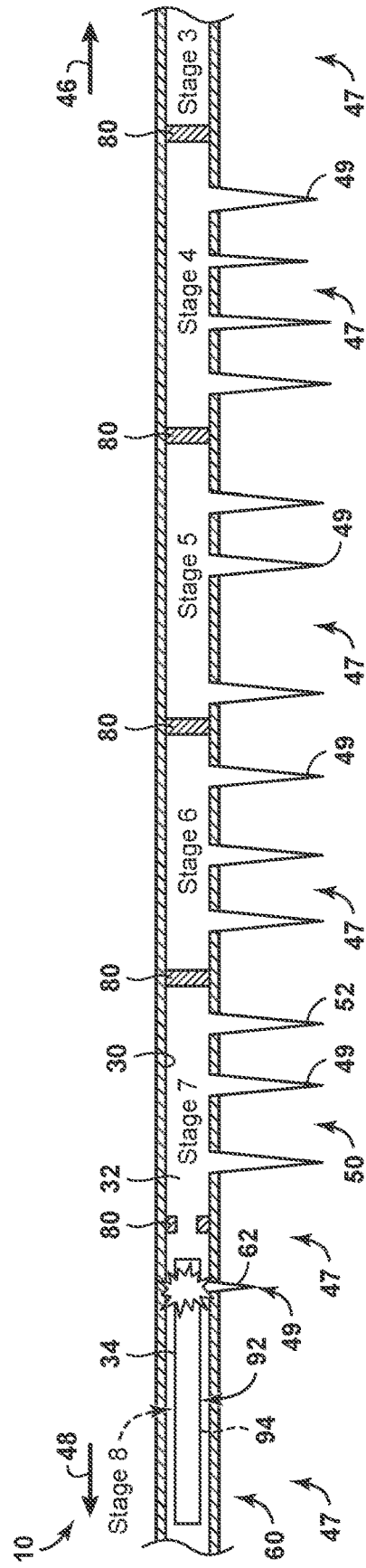

The positioning at 205 is illustrated in FIG. 3A and FIG. 3B. As illustrated therein, and during a completion operation on hydrocarbon well 10, a plurality of stages 47 may be fractured in an iterative and/or a sequential process that begins within a downhole-most stage and proceeds in an uphole direction 48. Each stage may be separated from one or more adjacent stages by corresponding plugs 80, which may permit and/or facilitate pressurization of each stage to form and/or define one or more corresponding fractures 49 therein.

It is within the scope of the present disclosure that methods 200 may be utilized to characterize the spatial property of any stage, which is referred to herein as the previously fractured stage, that is downhole from a stage that currently is being fractured, which is referred to herein as the subsequently fractured stage. With this in mind, methods 200 may be utilized to characterize the spatial property of, or to provide independent spatial property information for, every stage that is fractured within the hydrocarbon well. However, in the following discussions, stage 7 is referred to herein as previously fractured stage 50 and stage 8 is referred to herein as subsequently fractured stage 60.

In the example illustrated in FIG. 3A, stages 1-6 already have been fractured, and stage 7 is in the process of being fractured. As also illustrated in FIG. 3A, a perforation gun 94 has been positioned within a downhole region 32 of wellbore 30 that extends within previously fractured stage 50.

The positioning at 205 may be performed with any suitable timing and/or sequence during methods 200. As examples, the positioning at 205 may be performed prior to the fracturing at 210, the tripping at 215, the positioning at 220, the positioning at 225, the actuating at 230, the receiving at 235, the analyzing at 240, the creating at 245, the pressurizing at 250, the propping at 255, the modifying at 260, and/or the performing at 265.

Fracturing the previously fractured stage at 210 may include fracturing the previously fractured stage to form and/or define one or more previous stage fractures, or even a plurality of spaced-apart previous stage fractures, within the previously fractured stage. This may include actuating the perforation gun to perforate a downhole tubular that extends within the wellbore, pressurizing the wellbore to form, define, and/or expand the one or more previous stage fractures, and/or propping the one or more previous stage fractures. The fracturing at 210 is illustrated in FIG. 3A. As illustrated therein, perforation gun 94 has been actuated, and a previous stage fracture 52 is in the process of being formed and/or defined within the previously fractured stage.

The fracturing at 210 may be performed with any suitable timing and/or sequence during methods 200. As examples, the fracturing at 210 may be performed subsequent to the positioning at 205 and/or prior to the tripping at 215, the positioning at 220, the positioning at 225, the actuating at 230, the receiving at 235, the analyzing at 240, the creating at 245, the pressurizing at 250, the propping at 255, the modifying at 260, and/or the performing at 265.

Tripping the perforation gun from the downhole region at 215 may include pulling and/or removing the perforation gun from the downhole region of the wellbore and/or entirely from the wellbore. The tripping at 215 may be performed to permit and/or to facilitate the positioning at 220. As an example, and with reference to the transition between the configuration that is illustrated in FIG. 3A to the configuration that is illustrated in FIG. 3B, a plug 80 has been positioned within a region of wellbore 30 that extends between downhole region 32 of wellbore 30 and uphole region 34 of wellbore 30, such as via the positioning at 220. It may not be feasible and/or convenient to position the plug while perforation gun 94 is positioned within downhole region 32. As such, the tripping at 215 may be utilized to permit and/or facilitate the positioning at 220.

The tripping at 215 may be performed with any suitable timing and/or sequence during methods 200. As examples, the tripping at 215 may be performed subsequent to the positioning at 205 and/or the fracturing at 210. As additional examples, the tripping at 215 may be performed prior to the positioning at 220, the positioning at 225, the actuating at 230, the receiving at 235, the analyzing at 240, the creating at 245, the pressurizing at 250, the propping at 255, the modifying at 260, and/or the performing at 265.

Similarly, the positioning at 220 may be performed with any suitable timing and/or sequence during methods 200. As examples, the positioning at 220 may be performed subsequent to the positioning at 205, the fracturing at 210, and/or the tripping at 215. As additional examples, the positioning at 220 may be performed prior to the positioning at 225, the actuating at 230, the receiving at 235, the analyzing at 240, the creating at 245, the pressurizing at 250, the propping at 255, the modifying at 260, and/or the performing at 265.

Positioning the downhole acoustic wave source at 225 may include positioning the downhole acoustic wave source within the uphole region of the wellbore. This may include flowing and/or otherwise translating the downhole acoustic wave source in a downhole direction, from the surface region, and/or into the uphole region of the wellbore. The positioning at 225 is illustrated in FIG. 3B, wherein downhole acoustic wave source 92 is positioned within uphole region 34 of wellbore 30.

The positioning at 225 may be performed with any suitable timing and/or sequence during methods 200. As examples, the positioning at 225 may be performed subsequent to the positioning at 205, the fracturing at 210, the tripping at 215, and/or the positioning at 220. As additional examples, the positioning at 225 may be performed prior to the actuating at 230, the receiving at 235, the analyzing at 240, the creating at 245, the pressurizing at 250, the propping at 255, the modifying at 260, and/or the performing at 265.

Actuating the downhole acoustic wave source at 230 may include actuating the downhole acoustic wave source to initiate the received acoustic wave and/or to initiate propagation of the received acoustic wave in and/or within the wellbore. When methods 200 include the actuating at 230, the receiving at 235 may be responsive to and/or a result of the actuating at 230.

In some examples, the downhole acoustic wave source may include a charge, or an explosive charge, that may be actuated, ignited, exploded, and/or detonated to initiate propagation of the received acoustic wave in and/or within the wellbore. In some such examples, and as discussed, the downhole acoustic wave source includes and/or is the perforation gun. In some such examples, the perforation gun may include at least one wave source charge that does not form a perforation and/or fracture, and the actuating at 230 may include actuating the at least one wave source charge. In some such examples, the actuating at 230 may include actuating the perforation gun, such as to form a perforation and/or fracture within the subsequently fractured stage. This is illustrated in FIG. 3B, where perforation gun 94 has been actuated to form at least one subsequent stage fracture 62 within subsequently fractured stage 60.

In some such examples, the actuating at 230 may include forming a plurality of spaced-apart subsequent stage fractures within the subsequently fractured stage. In some such examples, the plurality of spaced-apart subsequent stage fractures may be at least partially sequentially formed and/or defined. Stated differently, and in some such examples, the actuating at 230 may include sequentially actuating the perforation gun a plurality of times, within the uphole region of the wellbore, to form and/or define the plurality of spaced-apart subsequent stage fractures within the subsequently fractured stage. In some such examples, the receiving at 235 may include receiving a corresponding received acoustic wave responsive to each actuation of the perforation gun. In some such examples, the analyzing at 240 may include analyzing a corresponding previously fractured stage characteristic acoustic component from each corresponding received acoustic wave. Stated differently, methods 200 may, in some examples, be utilized to produce and/or generate repeated, redundant, and/or complementary characterizations of the spatial property of the previously fractured stage.

The actuating at 230 may be performed with any suitable timing and/or sequence during methods 200. As examples, the actuating at 230 may be performed subsequent to the positioning at 205, the fracturing at 210, the tripping at 215, the positioning at 220, and/or the positioning at 225. As additional examples, the actuating at 230 may be performed prior to the receiving at 235, the analyzing at 240, the creating at 245, the pressurizing at 250, the propping at 255, the modifying at 260, and/or the performing at 265.

Receiving the received acoustic wave at 235 may include receiving the received acoustic wave with, via, and/or utilizing an acoustic transducer. The received acoustic wave may be initiated by the downhole acoustic wave source and may include a previously fractured stage characteristic acoustic component, which may be generated via propagation of the received acoustic wave within the downhole region of the wellbore. Examples of the acoustic transducer are disclosed herein with reference to acoustic transducer 70. Examples of the received acoustic wave are disclosed herein with reference to received acoustic wave 120. Examples of the previously fractured stage characteristic acoustic component are disclosed herein with reference to previously fractured stage characteristic acoustic component 122.

Figure 4:
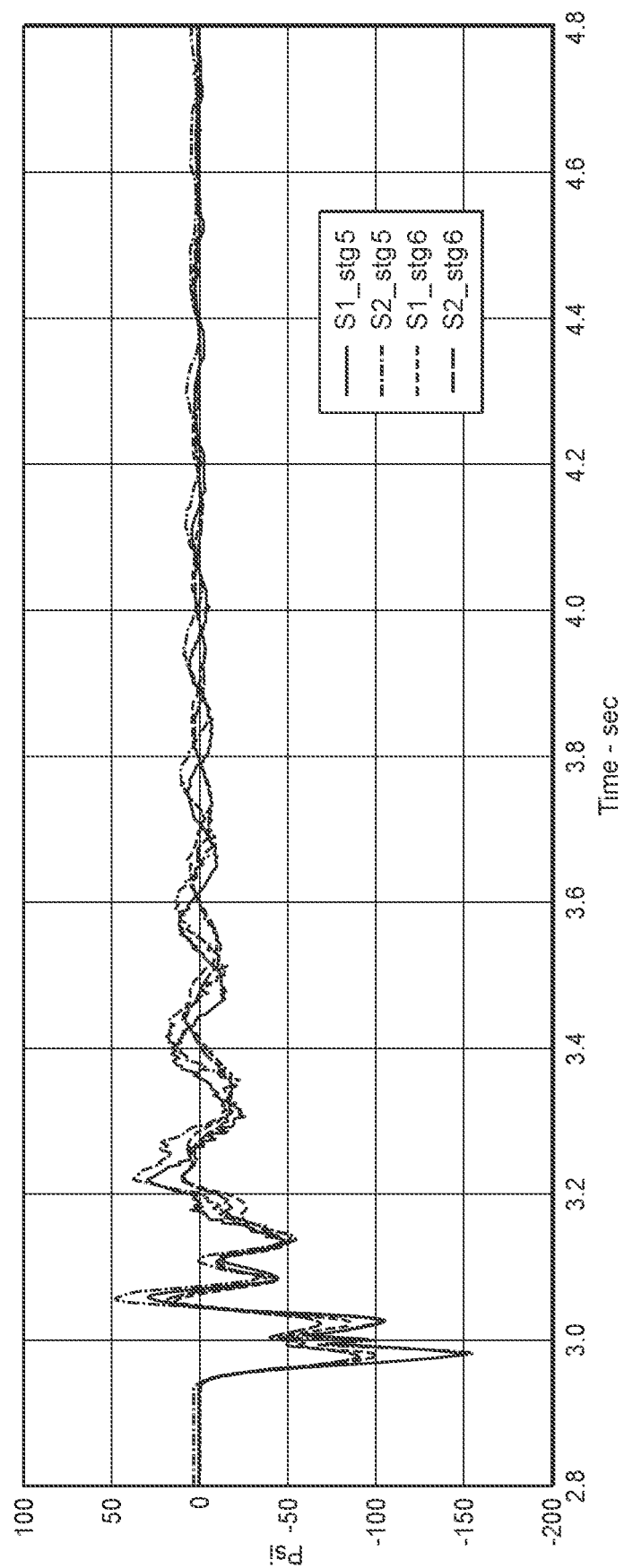
FIG. 4 is a plot illustrating examples of received acoustic waves that may be analyzed via methods, according to the present disclosure.

Examples of the received acoustic wave are illustrated in FIG. 4, which illustrates pressure, as measured by the acoustic transducer, as a function of time for a plurality of received acoustic wavers. More specifically, and when considered in the context of FIG. 3A and FIG. 3B, FIG. 4 illustrates the received acoustic wave for two perforation shots performed within stage 5 (s1_stg5 and s2_stg5) and also for two perforation shots performed within stage 6 (s1_stg6 and s2_stg6).

As discussed, a liquid, such as water and/or a liquid hydrocarbon, may extend within and/or fill the wellbore. With this in mind, the receiving at 235 may include receiving the received acoustic wave from and/or via the liquid. In some examples, the receiving at 235 may include receiving the received acoustic wave within a surface region that is external to, or vertically above, the subsurface region. In some such examples, and as discussed, the acoustic transducer may include and/or be a surface acoustic transducer that is positioned within the surface region, and the receiving at 235 may include receiving the received acoustic wave with, via, and/or utilizing the surface acoustic transducer.

In some examples, the receiving at 235 may include receiving the received acoustic wave within the wellbore and/or within the uphole region of the wellbore. In some such examples, the acoustic transducer may include and/or be a subsurface acoustic transducer, which may be positioned within the wellbore, may be operatively attached to a tool string that includes the downhole acoustic wave source, and/or may be directly attached to the downhole acoustic wave source. In such examples, the receiving at 235 may include receiving the received acoustic wave with, via, and/or utilizing the subsurface acoustic transducer. As discussed, the downhole acoustic wave source may include and/or be a perforation gun. In such examples, the subsurface acoustic transducer may be uphole from a plurality of perforation charges of the perforation gun and/or downhole from the plurality of perforation charges.

The receiving at 235 may be performed with any suitable timing and/or sequence during methods 200. As examples, the receiving at 235 may be performed subsequent to the positioning at 205, the fracturing at 210, the tripping at 215, the positioning at 220, the positioning at 225, and/or the actuating at 230. As another example, and as discussed, the receiving at 235 may be responsive to the actuating at 230. As additional examples, the receiving at 235 may be performed prior to the analyzing at 240, the creating at 245, the pressurizing at 250, the propping at 255, the modifying at 260, and/or the performing at 265.

Analyzing the previously fractured stage characteristic acoustic component at 240 may include analyzing to define, to calculate, to estimate, to correlate, and/or to characterize the spatial property of the previously fractured stage. The analyzing at 240 may be performed in any suitable manner. As an example, the analyzing at 240 may include correlating a decay rate of the previously fractured stage characteristic acoustic component to the spatial property of the previously fractured stage. As a more specific example, the spatial property of the previously fractured stage may include and/or be a fluid conductivity between the subsurface region and the downhole region of the wellbore, and the decay rate of the previously fractured stage characteristic acoustic component may be indicative of the fluid conductivity. More specifically, loss of fluid from the downhole region of the wellbore, into the subsurface region, and via the fluid conductivity may produce and/or generate at least a fraction of the decay rate of the previously fractured stage characteristic acoustic component.

As another example, the analyzing at 240 may include correlating a resonant frequency of the previously fractured stage characteristic acoustic component to the spatial property of the previously fractured stage. As an example, the resonant frequency of the previously fractured stage may be indicative of a compliance of the previously fractured stage. The compliance of the previously fractured stage may be indicative of a length of the downhole region of the wellbore, such as may be measured along the wellbore, and/or of a height of the previously fractured stage, such as may be measured in a direction that is perpendicular to the length of the wellbore and/or may be indicative of a distance that the previous stage fractures extend from the wellbore and/or into the subsurface region.

Figure 5:
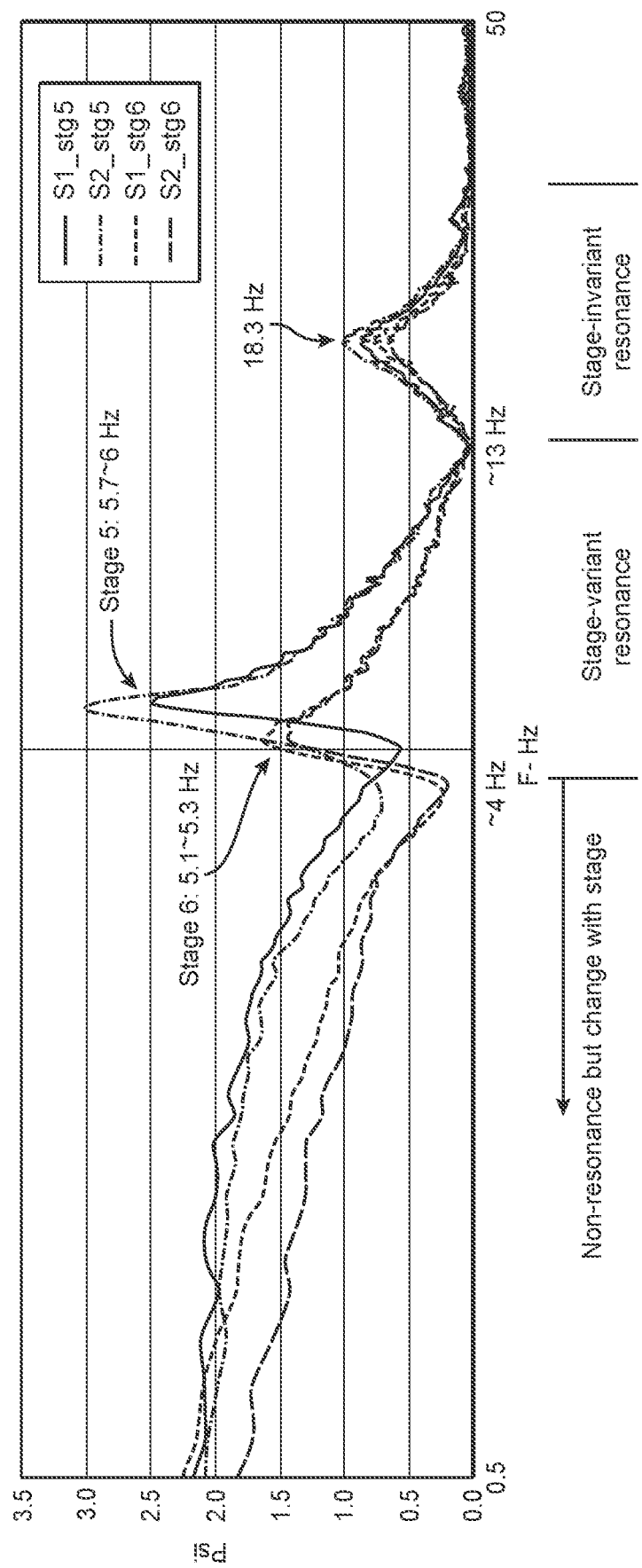
FIG. 5 is a spectral analysis of the received acoustic waves of FIG. 4.

In some examples, the resonant frequency of the previously fractured stage characteristic acoustic component may be determined via a spectral analysis, such as a Fourier Transform, of the received acoustic wave and/or of the previously fractured stage characteristic acoustic component. This is illustrated in FIG. 5, which is a spectral analysis (via Fourier Transform) of the received acoustic waves of FIG. 4. In FIG. 5, all four received acoustic waves exhibit a resonance at 18.3 Hertz (Hz). This resonance may be assumed to be related to factors outside a given stage, such as a remainder of the hydrocarbon well and/or a tool string that supports the downhole acoustic wave source and may be referred to herein as stage-invariant resonance. However, FIG. 5 also illustrates that stage 5 consistently exhibits a resonance at approximately 5.7-6 Hz, while stage 6 consistently exhibits a resonance that is shifted to approximately 5.1-5.3 Hz. These resonances may be indicative of the spatial property of the individual stages and may be referred to herein as stage-variant resonances. FIG. 5 further illustrates that, below approximately 4 Hz, the received acoustic wave exhibits stage-specific behavior that is not characterized, or at least strongly characterized, by a resonance frequency.

In some examples, the analyzing may include fitting, or curve fitting, the previously fractured stage characteristic acoustic component to a governing equation, such as to Equation 1:

$$p_f = A e^{-\beta(t-t_o)} \cos(\omega_r(t-t_o)+\theta) \qquad (1)$$

wherein $p_f$ is the previously fractured stage characteristic acoustic component, A is the peak amplitude of the previously fractured stage characteristic acoustic component, $\beta$ is a damping coefficient that quantifies a decay rate of the previously fractured stage characteristic acoustic component, t is time, $t_o$ is a peak time of the previously fractured stage characteristic acoustic component, $\omega_r$ is a resonant frequency of the previously fractured stage characteristic acoustic component, and θ is a phase shift parameter.

In some such examples, the analyzing at 240 may include modeling the downhole region of the wellbore as a liquid-filled volume and quantifying at least one property of acoustic propagation within the liquid-filled volume to characterize the spatial property of the previously fractured stage. The modeling may include forward-modeling of the previously fractured stage. The forward-modeling may include generation of a forward acoustic response model of the previously fractured stage. The forward acoustic response model may be parametrized to incorporate information regarding a number of fractures, a fracture size, a fracture location, and/or a proppant distribution within the previously fractured stage. An inversion algorithm may be utilized to estimate these parameters and/or to match the forward acoustic response model to observed data.

Figure 6:
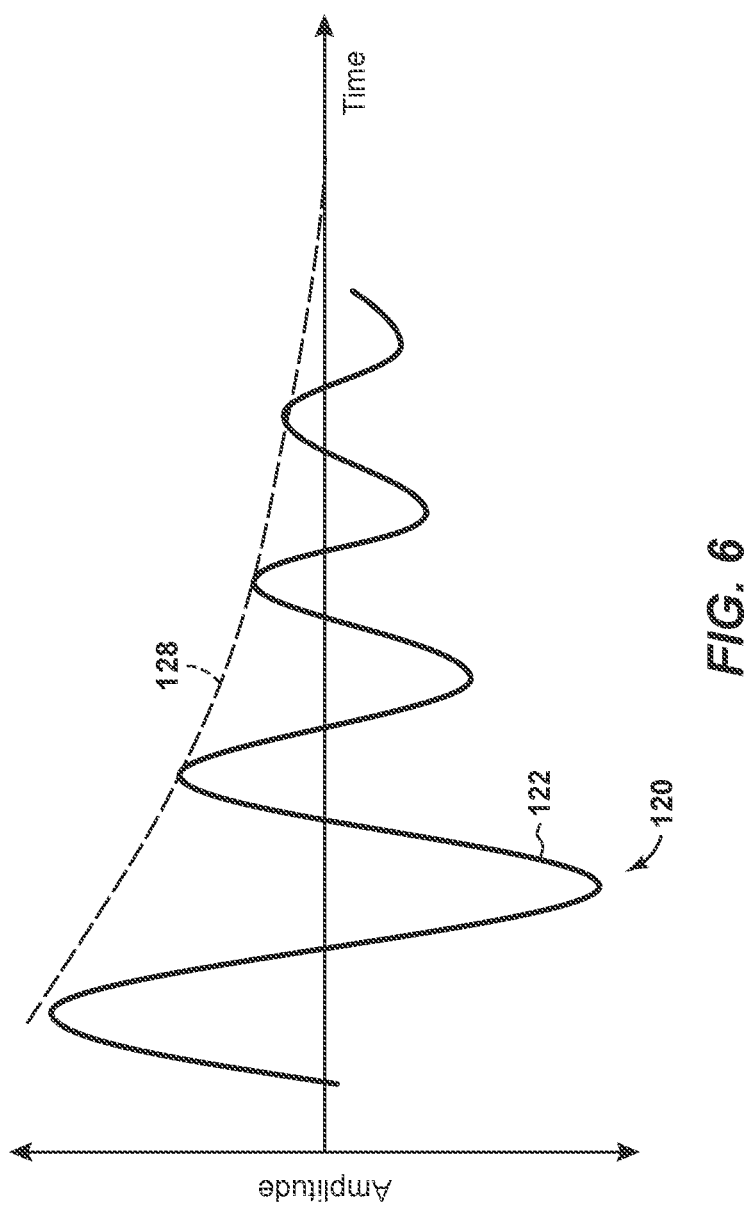
FIG. 6 is a schematic illustration of an example of acoustic wave propagation within a downhole region of a wellbore, according to the present disclosure.

An example of the fitting is illustrated in FIG. 6. As illustrated therein, an amplitude of previously fractured stage characteristic acoustic component 122 of received acoustic wave 120 may decay with increasing time. This decay may be modeled by an exponential decay function 126, such as the exponential decay function of Equation 1. Stated differently, damping coefficient β may be utilized to describe the decay rate of the previous stage characteristic acoustic component and/or may be correlated to the spatial property of the previously fractured stage, such as to the fluid conductivity between the subsurface region and the downhole region of the wellbore.

In some examples, the received acoustic wave may include additional information, which may be unrelated to the previously fractured stage characteristic acoustic component. As an example, as discussed herein with reference to FIG. 1, and upon actuation of the downhole acoustic wave source, a downhole acoustic wave may propagate in a downhole direction, and an uphole acoustic wave may propagate in an uphole direction. The downhole acoustic wave may propagate through the aperture that is defined by the plug and/or within the previously fractured stage. The previously fractured stage characteristic acoustic component may include a portion of the downhole acoustic wave that propagates within the downhole region of the wellbore. However, the uphole acoustic wave, which may not include information regarding the previously fractured stage, also may be received by the acoustic transducer and/or may form a portion of the received acoustic wave. With this in mind, the analyzing at 240 also may include filtering the uphole acoustic wave from the received acoustic wave. Such filtering may be beneficial to improve and/or facilitate analysis of the previously fractured stage characteristic acoustic component, such as by increasing a signal-to-noise ratio of the previously fractured stage characteristic acoustic component within the received acoustic wave.

In some examples, the analyzing at 240 additionally or alternatively may include filtering noise from the received acoustic wave to improve and/or facilitate analysis of the previously fractured stage characteristic acoustic component. Examples of the noise include pumping noise and/or noise generated via resonance of a perforation string to which the downhole acoustic wave source is attached or otherwise coupled.

The analyzing at 240 may be performed with any suitable timing and/or sequence during methods 200. As examples, the analyzing at 240 may be performed subsequent to the positioning at 205, the fracturing at 210, the tripping at 215, the positioning at 220, the positioning at 225, the actuating at 230, and/or the receiving at 235. As additional examples, the analyzing at 240 may be performed prior to and/or at least partially concurrently with the creating at 245, the pressurizing at 250, the propping at 255, the modifying at 260, and/or the performing at 265.

Creating the seal at 245 may include creating any suitable seal, within the wellbore and/or between the uphole region of the wellbore and the downhole region of the wellbore that resists fluid communication between the uphole region of the wellbore and the downhole region of the wellbore. As an example, and when the plug, which includes the aperture, is positioned within the region of the wellbore that is between the uphole region of the wellbore and the downhole region of the wellbore, the creating at 245 may include sealing the aperture, such as to permit and/or to facilitate the pressurizing at 250. Stated differently, the creating at 245 may include sealing the aperture to resist fluid communication between the uphole region of the wellbore and the downhole region of the wellbore and/or to resist fluid flow from the uphole region of the wellbore to the downhole region of the wellbore.

The creating at 245 may be performed with any suitable timing and/or sequence during methods 200. As examples, the creating at 245 may be performed subsequent to the positioning at 205, the fracturing at 210, the tripping at 215, the positioning at 220, the positioning at 225, the actuating at 230, the receiving at 235, and/or the analyzing at 240. As additional examples, the creating at 245 may be performed prior to the pressurizing at 250, the propping at 255, the modifying at 260, and/or the performing at 265.

Pressurizing the uphole region at 250 may include pressurizing the uphole region of the wellbore with, via, and/or utilizing a fracture liquid. This may include flowing the fracture fluid into the wellbore and/or pressurizing the uphole region of the wellbore to form and/or define one or more subsequent stage fractures, to form a plurality of spaced-apart subsequent stage fractures, and/or to increase a fracture size of the subsequent stage fractures.

The pressurizing at 250 may be performed with any suitable timing and/or sequence during methods 200. As examples, the pressurizing at 250 may be performed subsequent to the positioning at 205, the fracturing at 210, the tripping at 215, the positioning at 220, the positioning at 225, the actuating at 230, the receiving at 235, the analyzing at 240, and/or the creating at 245. As additional examples, the pressurizing at 250 may be performed prior the propping at 255, the modifying at 260, and/or the performing at 265.

Propping subsequent stage fractures at 255 may include propping the one or more subsequent stage fractures, or even the plurality of spaced-apart subsequent stage fractures, such as via utilizing a proppant. As an example, the proppant may be included and/or entrained within the fracturing liquid such that flow of the fracturing liquid into the subsequent stage fractures also flows the proppant into the subsequent stage fractures. The proppant then may prop the subsequent stage fractures open and/or may decrease a potential for narrowing of the subsequent stage fractures upon ceasing the pressurizing at 250.

The propping at 255 may be performed with any suitable timing and/or sequence during methods 200. As examples, the propping at 255 may be performed subsequent to the positioning at 205, the fracturing at 210, the tripping at 215, the positioning at 220, the positioning at 225, the actuating at 230, the receiving at 235, the analyzing at 240, the creating at 245, and/or the pressurizing at 250. As another example, the propping at 255 may be performed at least partially concurrently with and/or responsive to the pressurizing at 250. As additional examples, the propping at 255 may be performed prior the modifying at 260 and/or the performing at 265.

In some examples, the analyzing at 240 may include determining whether and/or if the spatial property of the previously fractured stage differs from a desired spatial property of the previously fractured stage. In some such examples, the analyzing at 240 further may include determining that the spatial property does indeed differ from the desired spatial property. In some examples, the spatial property of the previously fractured stage includes a fracture uniformity within the previously fractured stage. In such examples, the analyzing at 240 may include determining that the fracture uniformity within the previously fractured stage is less than a threshold minimum fracture uniformity. In some examples, the spatial property of the previously fractured stage includes a fluid conductivity between the downhole region of the wellbore and the subsurface region. In such examples, the analyzing at 240 may include determining that the fluid conductivity is less than a threshold minimum fluid conductivity.

In some examples, and responsive to the spatial property of the previously fractured stage differing from the desired spatial property of the previously fractured stage, methods 200 further may include modifying the stage parameter at 260. The modifying at 260 may include modifying at least one stage parameter for at least one other fractured stage of the hydrocarbon well. Stated differently, and as discussed, the hydrocarbon well may include a plurality of sequentially defined stages, and methods 200 may be performed during a subset, or even all, of the plurality of sequentially defined stages. With this in mind, and upon determining that, for a given stage, the spatial property differs from the desired spatial property, methods 200 subsequently may modify the at least one stage parameter for the at least one other stage, such as to, or to attempt to, cause the spatial property for the at least one other stage to correspond to the desired spatial property for the at least one other stage. Examples of the at least one stage parameter include a stage length of the at least one other fractured stage of the hydrocarbon well, a fracture spacing within the at least one other fractured stage of the hydrocarbon well, a fracture pressure utilized to fracture the at least one other fractured stage of the hydrocarbon well, and/or a perforation hole size generated by the perforation gun within the at least one other fractured stage of the hydrocarbon well.

In some examples, and responsive to the spatial property of the previously fractured stage differing from the desired spatial property of the previously fractured stage, methods 200 further may include performing the intervention operation at 265. The performing at 265 may include performing the intervention operation within the previously fractured stage, such as to, or in an effort to, cause the spatial property of the previously fractured stage to correspond to the desired spatial property of the previously fractured stage. The intervention operation may include and/or be any suitable intervention operation. As an example, the performing the intervention operation may include pressurizing, or repressurizing, and propping, or repropping, the previously fractured stage, such as to increase a size of fractures within the previously fractured stage. As another example, the performing the intervention operation may include utilizing the perforation gun to re-fracture the previously fractured stage. This may include deploying a diversion material to seal one or more previously formed subsequent zone fractures, perforating the downhole tubular within the uphole region of the wellbore and utilizing the perforation gun, and repressurizing the uphole region of the wellbore, and/or repropping the uphole region of the wellbore.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method of producing hydrocarbons from a hydrocarbon well, wherein the hydrocarbon well includes a wellbore that extends within a subsurface region, and further wherein the previously fractured stage includes at least one previous stage fracture that extends from the wellbore, the method comprising:
    initiating a received acoustic wave by a downhole acoustic wave source that is positioned within an uphole region of the wellbore;
    receiving, with an acoustic transducer, the received acoustic wave, wherein:
    (i) the uphole region of the wellbore extends within a subsequently fractured stage of the hydrocarbon well, and further wherein the uphole region of the wellbore is uphole from a downhole region of the wellbore, which extends within the previously fractured stage; and
    (ii) the received acoustic wave includes a previously fractured stage characteristic acoustic component generated via propagation of the received acoustic wave within the downhole region of the wellbore; and
    analyzing the previously fractured stage characteristic acoustic component of the received acoustic wave to characterize the spatial property of the previously fractured stage;
    responsive to the spatial property of the previously fractured stage, modifying a stage parameter of a subsequent stage of fracturing;
    fracturing the subsequent stage based on the modified stage parameter; and
    producing the hydrocarbons from the hydrocarbon well via fractures in the subsequently fractured stage.

2. The method of claim 1, wherein the receiving the received acoustic wave includes receiving the received acoustic wave from at least one of a liquid, water, and a liquid hydrocarbon that extends within the wellbore.

3. The method of claim 1, wherein the receiving the received acoustic wave includes receiving the received acoustic wave within a surface region, which is external the subsurface region.

4. The method of claim 3, wherein the acoustic transducer is a surface acoustic transducer, which is positioned within the surface region.

5. The method of claim 1, wherein the receiving the received acoustic wave includes at least one of:
(i) receiving the received acoustic wave within the wellbore; and
(ii) receiving the received acoustic wave within the uphole region of the wellbore.

6. The method of claim 5, wherein the acoustic transducer is a subsurface acoustic transducer, which is at least one of:
(i) positioned within the wellbore;
(ii) operatively attached to a tool string that includes the downhole acoustic wave source; and
(iii) directly attached to the downhole acoustic wave source.

7. The method of claim 1, wherein the downhole acoustic wave source includes a perforation gun.

8. The method of claim 7, wherein the received acoustic wave is initiated by the perforation gun during actuation of the perforation gun to fracture the subsequently fractured stage of the hydrocarbon well.

9. The method of claim 7, wherein the received acoustic wave is generated by a wave source charge of the perforation gun.

10. The method of claim 7, wherein the subsurface acoustic transducer is at least one of:
(i) uphole from a plurality of perforation charges of the perforation gun; and
(ii) downhole from the plurality of perforation charges of the perforation gun.

11. The method of claim 7, wherein, prior to the receiving, the method further includes actuating the perforation gun to fracture the subsequently fractured stage, wherein the receiving is responsive to the actuating.

12. The method of claim 11, wherein the actuating the perforation gun includes forming a plurality of spaced-apart subsequent stage fractures within the subsequently fractured stage.

13. The method of claim 12, wherein the actuating the perforation gun includes sequentially actuating the perforation gun a plurality of times, within the uphole region of the wellbore, to form the plurality of spaced-apart subsequent stage fractures within the subsequently fractured stage.

14. The method of claim 13, wherein the receiving includes receiving a corresponding received acoustic wave responsive to each actuation of the perforation gun.

15. The method of claim 14, wherein the analyzing includes analyzing a corresponding previously fractured stage characteristic acoustic component from each corresponding received acoustic wave.

16. The method of claim 11, wherein, prior to the actuating the perforation gun, the method further includes positioning the perforation gun within the uphole region of the wellbore.

17. The method of claim 11, wherein, subsequent to the actuating the perforation gun, the method further includes creating a seal to resist fluid communication between the uphole region of the wellbore and the downhole region of the wellbore.

18. The method of claim 17, wherein, subsequent to the creating the seal, the method further includes pressurizing the uphole region of the wellbore with a fracture liquid to increase a fracture size of the plurality of spaced-apart subsequent stage fractures.

19. The method of claim 18, wherein, at least partially concurrently with the pressurizing, the method further includes propping the plurality of spaced-apart subsequent stage fractures.

20. A hydrocarbon well, comprising:
a controller programmed to characterize a spatial property of a previously fractured stage of the hydrocarbon well according to the method of claim 1;
the wellbore that extends within the subsurface region;
the previously fractured stage including the at least one previous stage fracture that extends from the wellbore;
the downhole acoustic wave source positioned within the uphole region of the wellbore; and
the acoustic transducer.

* * * * *